(12) United States Patent
Tsai

(10) Patent No.: US 7,766,368 B2
(45) Date of Patent: Aug. 3, 2010

(54) RETRACTABLE FRAME STRUCTURE OF A BABY STROLLER

(75) Inventor: Raymond Tsai, Tainan Hsien (TW)

(73) Assignee: Singaroo International Co., Ltd., Tainan Hsien (TW)

( * ) Notice: Subject to any disclaimer, the term of this patent is extended or adjusted under 35 U.S.C. 154(b) by 302 days.

(21) Appl. No.: 12/078,484

(22) Filed: Apr. 1, 2008

(65) Prior Publication Data
US 2008/0284136 A1    Nov. 20, 2008

(30) Foreign Application Priority Data
May 14, 2007    (DE) .................. 20 2007 006 865 U

(51) Int. Cl.
*B62B 1/00*    (2006.01)
(52) U.S. Cl. ...................... 280/649; 280/642; 280/650; 280/658; 280/47.38
(58) Field of Classification Search ................. 280/642, 280/647, 649, 650, 652, 657, 658, 47.38, 280/42
See application file for complete search history.

(56) References Cited

U.S. PATENT DOCUMENTS

| | | | | |
|---|---|---|---|---|
| 2,013,910 A * | 9/1935 | Burst | ......................... | 280/642 |
| 3,222,081 A * | 12/1965 | Harmon, Jr. | ................ | 280/648 |
| 4,019,757 A * | 4/1977 | Beger et al. | ................. | 280/649 |
| 4,324,410 A * | 4/1982 | Perego | ...................... | 280/642 |
| 4,335,900 A * | 6/1982 | Fleischer | .................... | 280/649 |
| 4,848,787 A * | 7/1989 | Kassai | ........................ | 280/642 |
| 4,993,743 A * | 2/1991 | Takahashi et al. | ........... | 280/642 |
| 6,478,104 B1 * | 11/2002 | Kemper | ...................... | 280/642 |
| 6,712,382 B2 * | 3/2004 | Song | .......................... | 280/642 |
| 6,755,435 B2 * | 6/2004 | Hsia | .......................... | 280/649 |

* cited by examiner

*Primary Examiner*—Hau V Phan
(74) *Attorney, Agent, or Firm*—Rosenberg, Klein & Lee

(57)    ABSTRACT

A retractable frame structure of a baby stroller includes a frame, a pair of scissors-type linking sets, a push rod and a linking rod. Each scissors-type linking set is connected with the push rod and the link rod, respectively. When pushing the pushing rod, the scissors-type linking set will be collapsed and the linking rod will urge front wheels to move backward towards rear wheels, thus the collapsed stroller has a compact size which is convenient to carry and to store.

2 Claims, 6 Drawing Sheets

RETRACTABLE FRAME STRUCTURE OF A BABY STROLLER

BACKGROUND OF THE INVENTION

1. Field of the Invention

The present invention relates to a retractable frame structure of a baby stroller, and more particularly to a frame which can shorten the distance between front wheels and rear wheels to minimize the collapsed size for carrying and storage convenience.

2. Description of the Prior Art

There are two types of baby strollers on the market currently. The two types are categorized as simple and heavy (luxury) types. The heavy type stroller has a large size and heavy weight, which is made collapsible for carry and storage purposes. The collapsing process is to move the upper sector and the lower sector of a linking set to overlap in a vertical direction. This collapsing process can not move front and rear wheels, which means no matter how the stroller is collapsed or folded, the distance between the front wheels and the rear wheels of the stroller are not changeable, therefore the size is still relatively large for carrying and storage.

SUMMARY OF THE INVENTION

According to the present invention, there is provided a retractable frame structure of a baby stroller, comprising:

a frame having two sides;

a pair of scissors-type linking sets pivoted to the two sides of said frame, each said scissors-type linking set comprising a first rod member, a second rod member and an engaging block, said first rod member and said second rod member being pivotally connected to said engaging block in a crossed manner, said first rod member having a first end and a second end, said second rod member having a first end and a second end, said first end of said first rod member and said first end of said second rod member being pivotally connected to said frame, respectively, said second end of said first rod member being connected with a rear wheel and a locating rod, said locating rod having an engaging end;

a push rod pivoted to said first end of said second rod member of said scissors-type linking set; and a linking rod pivoted to said engaging end of said locating rod, said linking rod having a first end and a second end, said first end of said linking rod being pivotally connected to said second end of said second rod member of said scissors-type linking set, said second end of said linking rod being pivotally connected to a front wheel.

Preferably, said engaging block is provided with an engaging hole, and said push rod is provided with an engaging device for connection of said first end of said second rod member of said scissors-type linking set, said engaging device comprising a pulling arm at one end and a pin at another end, said pin being controlled by said pulling arm to extend or to retract within said engaging hole of said engaging block.

It is the primary object of the present invention to provide a retractable frame structure of a baby stroller, which rolls front wheels backward towards rear wheels to shorten the distance between the front and rear wheels so as to minimize its size for carrying and storage purposes.

It is another object of the present invention to provide a retractable frame structure of a baby stroller, which may be installed on baby strollers with different sizes.

It is a further object of the present invention to provide a retractable frame structure of a baby stroller, which is easy to operate and is safe to users.

DETAILED DESCRIPTION OF THE PREFERRED EMBODIMENT

Figure 1:
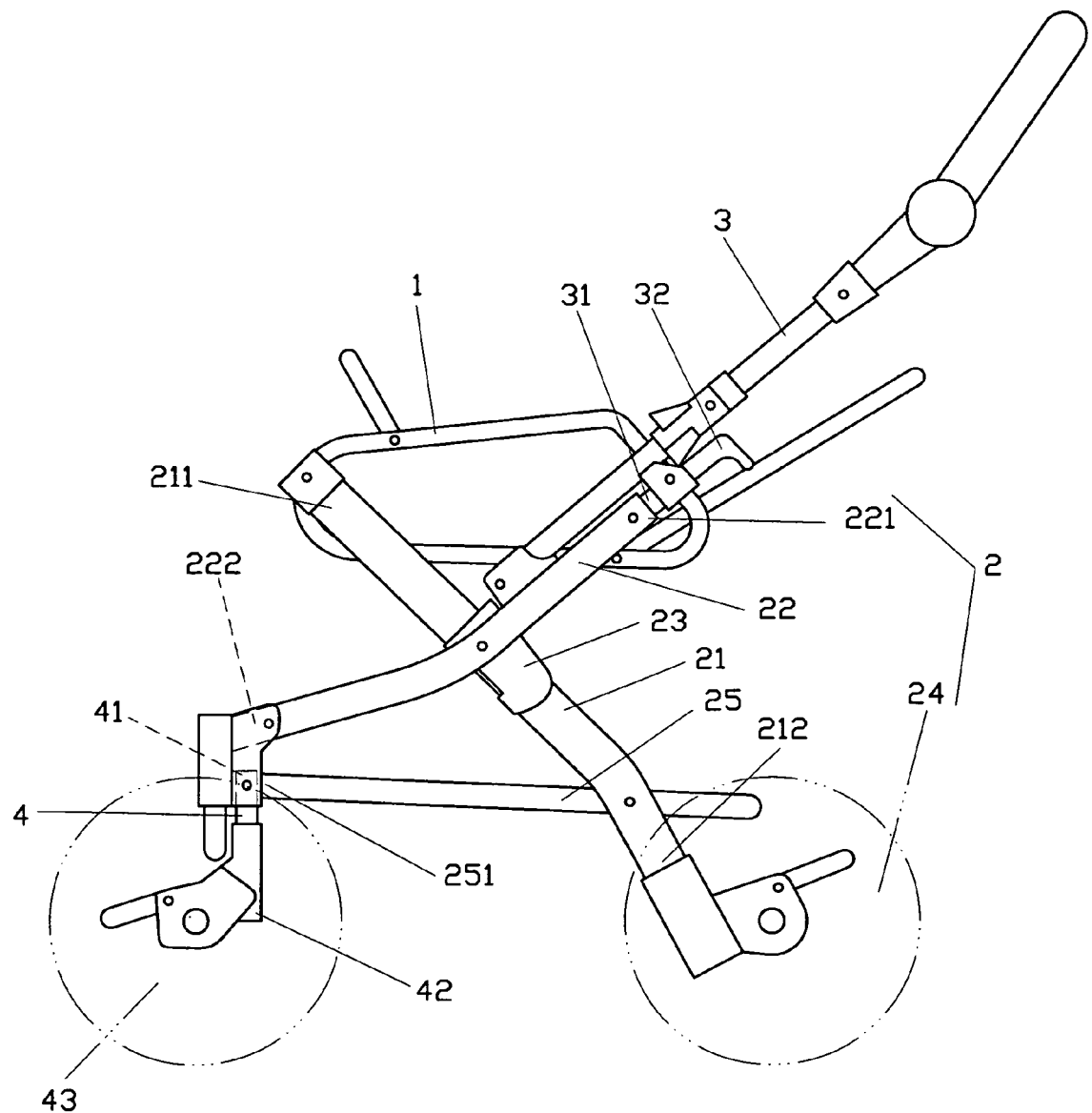
FIG. 1 is a side view of the present invention.
Figure 2:
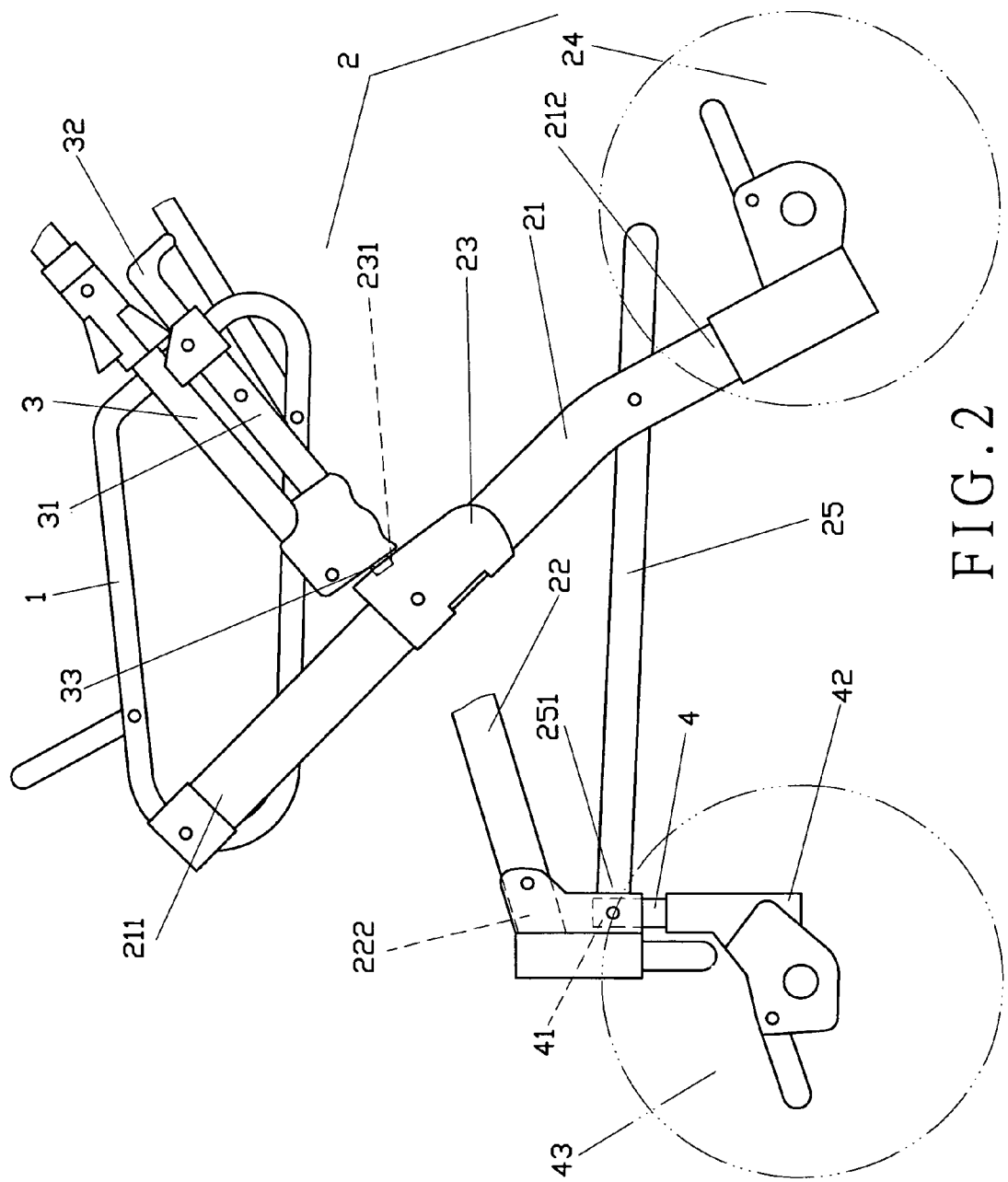
FIG. 2 is a side view showing an engaging device of the present invention.

As shown in FIGS. 1 and 2, a preferred embodiment of the present invention comprises a frame 1, a pair of scissors-type linking sets 2, a push rod 3, and a linking rod 4.

The frame 1 is in a square shape and incorporated with clothes (not shown in the drawings) to form a seat for a baby to seat thereon.

The scissors-type linking sets 2 are pivotally connected to two sides of the frame 1, and each comprises a first rod member 21, a second rod member 22, and an engaging block 23. The first rod member 21 and the second rod member 22 are connected to each other and pivoted to the engaging block 23 in a crossed manner. The first rod member 21 has a first end 211 and a second end 212. The second rod member 22 has a first end 221 and a second end 222. The first end 211 of the first rod member 21 and the first end 221 of the second rod member 22 are pivoted to the front and the rear of the frame 1. The engaging block 23 is formed with an engaging hole 231. The second end 212 of the first rod member 21 is connected with a rear wheel 24. A locating rod 25 is connected to the second end 212 near the rear wheel 24. The locating rod 25 has an engaging end 251 at one end thereof.

The push rod 3 is provided with an engaging device 31 at one side for connection with the first end 221 of the second rod member 22. The engaging device 31 comprises a pulling arm 32 at one end and a pin 33 at the other end. The pin 33 is controlled by the pulling arm 32 to extend and to retract. The pin 33 is extended in the engaging hole 231 of the engaging block 23 constantly to restrain the first rod member 21 and the second rod member 22 from moving with each other.

The linking rod 4 is pivoted to the engaging end 251 of the locating rod 25, and has a first end 41 and a second end 42. The first end 41 is pivotally connected to the second end 222 of the second rod member 22 of the scissors-type linking set 2, while the second end 42 of the linking rod 4 is pivotally connected to a front wheel 43.

Figure 3:
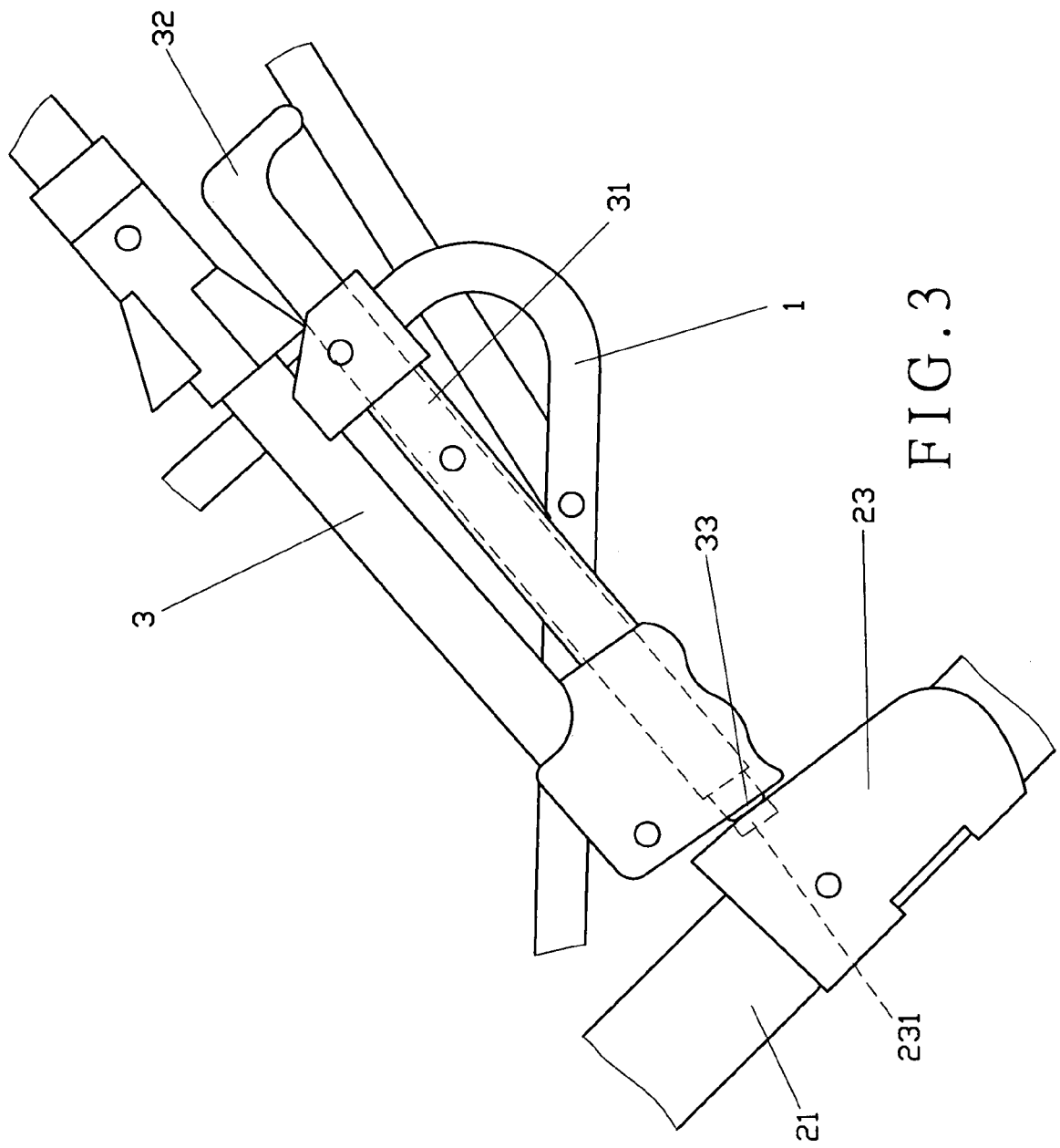
FIG. 3 is a side view showing that the engaging device is in a released status.
Figure 4:
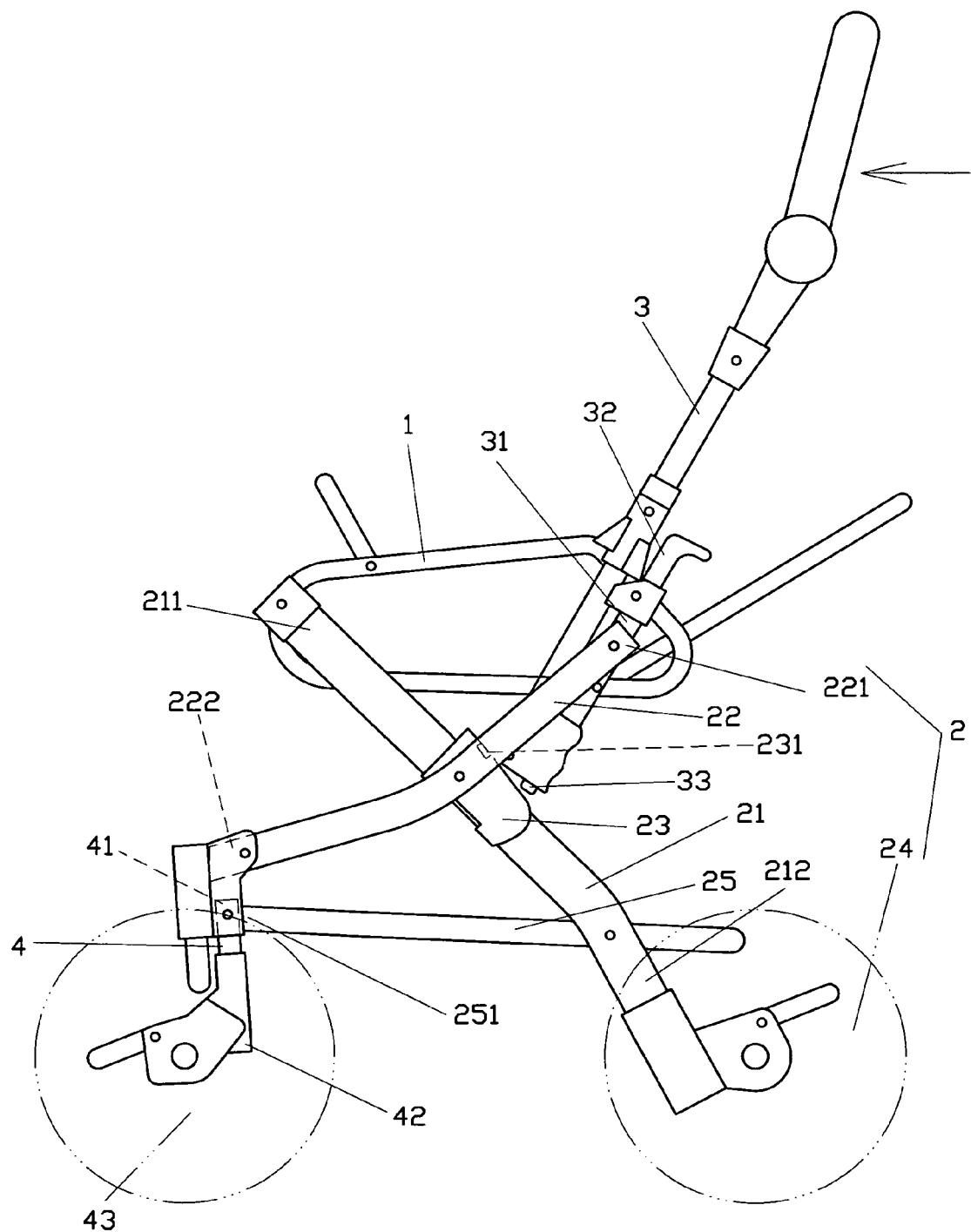
FIG. 4 is a side view showing that the present invention is ready to start its collapsed process.
Figure 5:
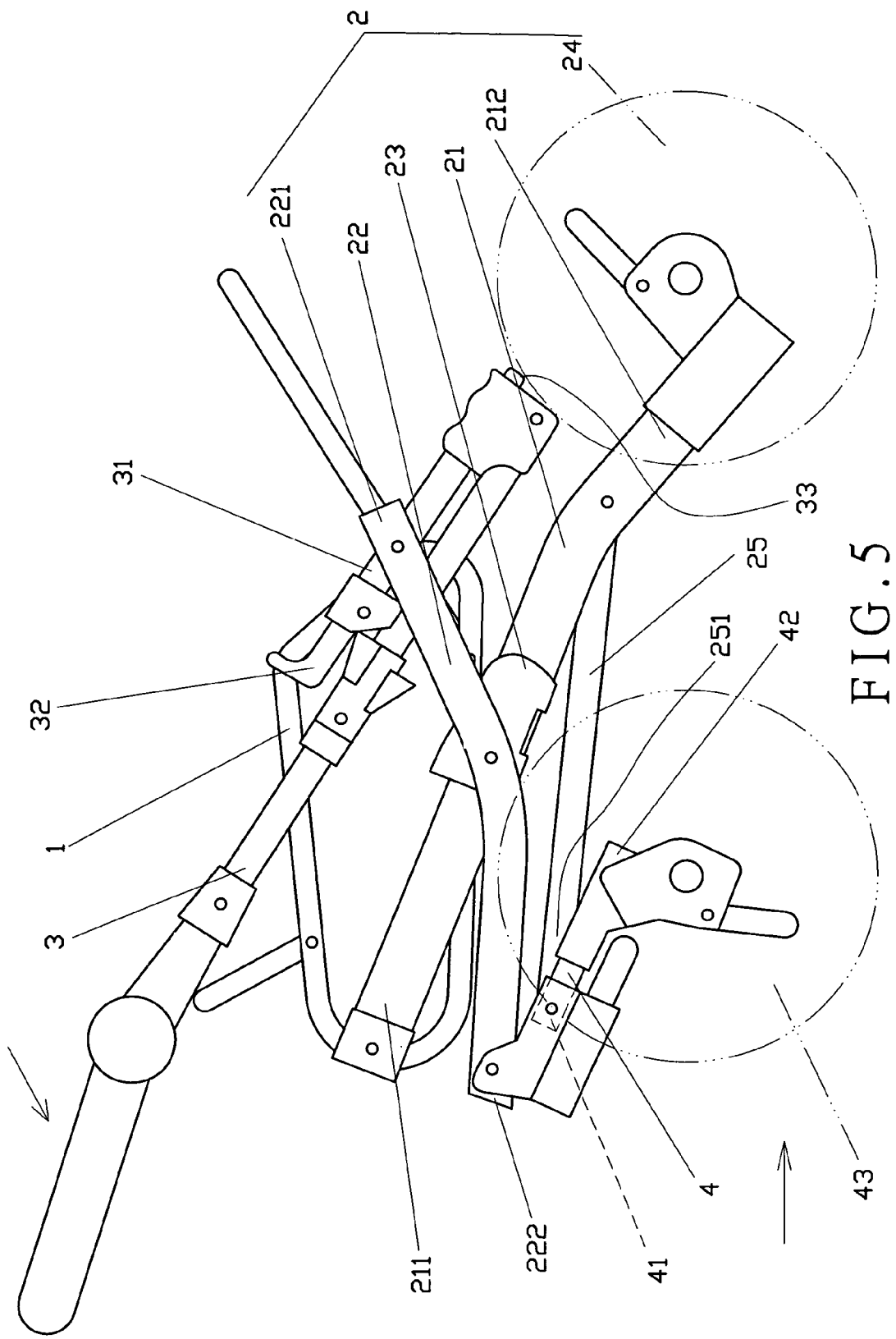
FIG. 5 is a side view showing that the present invention is in half way of collapsing.
Figure 6:
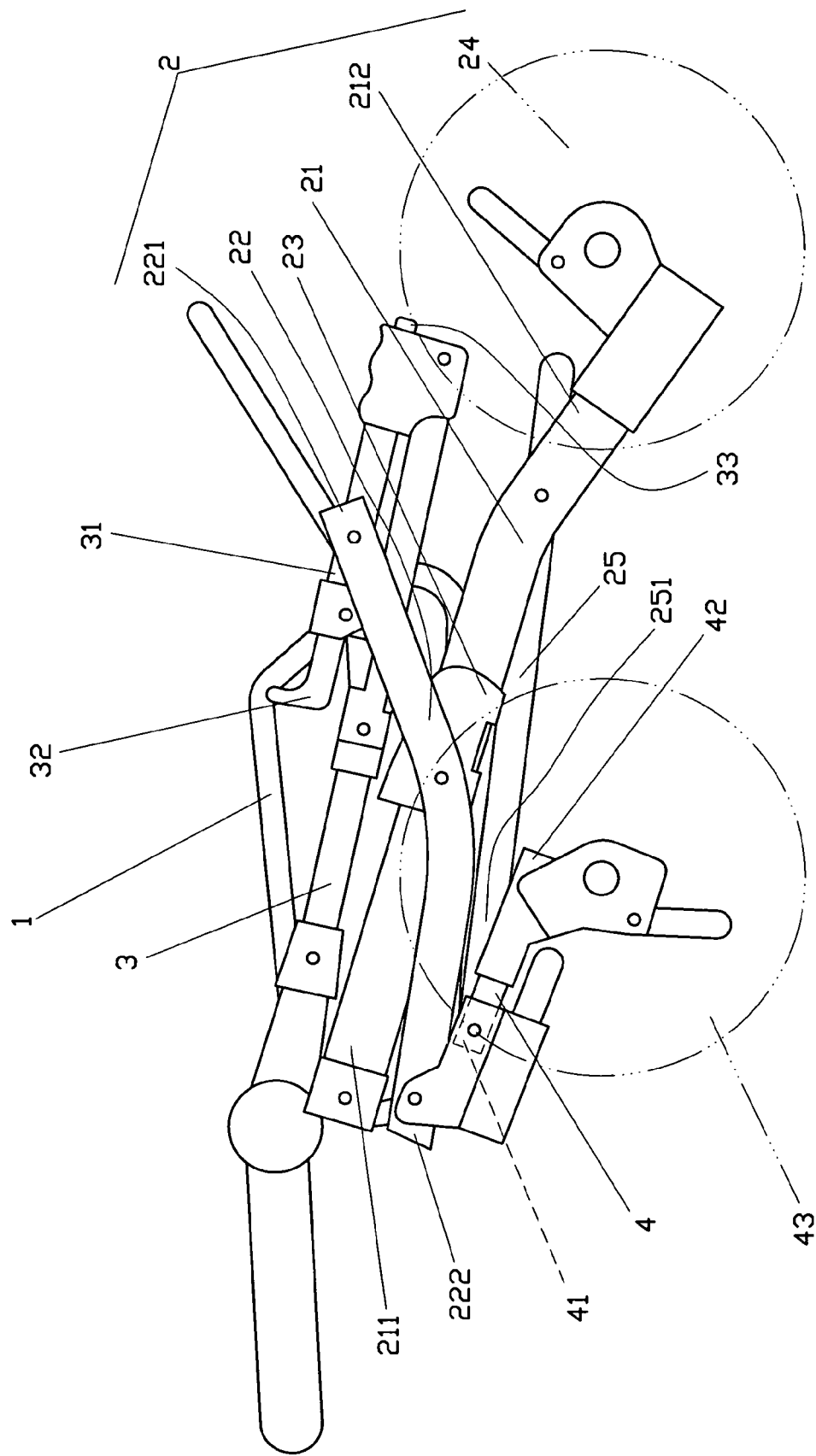
FIG. 6 is a side view showing the present invention in a collapsed status.

To collapse the present invention, as shown in FIG. 3, the pulling arm 32 of the engaging device 31 is pulled upward to urge the pin 33 to detach from the engaging hole 231 and retract into the engaging device 31. By pushing the push rod 3 forward and downward simultaneously, as shown in FIG. 4, the push rod 3 through the engaging device 31 to link the scissors-type linking set 2 to move. The first end 211 of the first rod member 21 is pushed downward towards the second end 222 of the second rod member 22, and the first end 221 of the second rod member 22 is moving downward towards the second end 212 of the first rod member 21, as shown in FIGS.

4 and 5. The downward force from the second rod member 22 pushes the first end 41 of the linking rod 4 forward, thus the second end 42 of the linking rod 4 moves backward, which brings the front wheel 43 to roll back towards the rear wheel 24 until the first end 41 reaches to its limits, then the pushing force will stop. This shortens the distance between the front wheel 43 and the rear wheel 24, and minimizes the size of the collapsed stroller.

What is claimed is:

1. A retractable frame structure of a baby stroller, comprising:

a frame having two sides;

a pair of scissors-type linking sets pivoted to the two sides of said frame, each said scissors-type linking set comprising a first rod member, a second rod member and an engaging block, said first rod member and said second rod member being pivotally connected to said engaging block in a crossed manner, said first rod member having a first end and a second end, said second rod member having a first end and a second end, said first end of said first rod member and said first end of said second rod member being pivotally connected to said frame, respectively, said second end of said first rod member being connected with a rear wheel and a locating rod, said locating rod having an engaging end;

a push rod pivoted to said first end of said second rod member of said scissors-type linking set; and a linking rod pivoted to said engaging end of said locating rod, said linking rod having a first end and a second end, said first end of said linking rod being pivotally connected to said second end of said second rod member of said scissors-type linking set, said second end of said linking rod being pivotally connected to a front wheel.

2. The retractable frame structure of a baby stroller, as recited in claim 1, wherein said engaging block is provided with an engaging hole, and said push rod is provided with an engaging device for connection of said first end of said second rod member of said scissors-type linking set, said engaging device comprising a pulling arm at one end and a pin at another end, said pin being controlled by said pulling arm to extend or to retract within said engaging hole of said engaging block.

* * * * *